(12) United States Patent
Wu et al.

(10) Patent No.: US 12,626,404 B2
(45) Date of Patent: May 12, 2026

(54) TRAINING A POSE ESTIMATION MODEL TO DETERMINE ANATOMY KEYPOINTS IN IMAGES

(71) Applicant: INTERNATIONAL BUSINESS MACHINES CORPORATION, Armonk, NY (US)

(72) Inventors: Bo Wu, Cambridge, MA (US); Chuang Gan, Cambridge, MA (US); Yada Zhu, Irvington, NY (US); Pin-Yu Chen, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 18/327,608

(22) Filed: Jun. 1, 2023

(65) Prior Publication Data

US 2024/0404106 A1     Dec. 5, 2024

(51) Int. Cl.
| | |
|---|---|
| *G06T 7/77* | (2017.01) |
| *G06T 7/11* | (2017.01) |
| *G06V 20/70* | (2022.01) |

(52) U.S. Cl.
CPC .................. *G06T 7/77* (2017.01); *G06T 7/11* (2017.01); *G06V 20/70* (2022.01); *G06T 2207/20081* (2013.01)

(58) Field of Classification Search
CPC ... G06T 7/77; G06T 7/11; G06T 2207/20081; G06T 2207/10081; G06T 2207/20076;
(Continued)

(56) References Cited

U.S. PATENT DOCUMENTS

| | | | | |
|---|---|---|---|---|
| 8,579,620 B2 * | 11/2013 | Wu | ...................... | B29C 64/386 |
| | | | | 703/2 |
| 9,646,411 B2 * | 5/2017 | Lee | ......................... | G06T 17/10 |

(Continued)

FOREIGN PATENT DOCUMENTS

| | | |
|---|---|---|
| CN | 110188700 B | 8/2019 |
| CN | 111695457 A | 9/2020 |

(Continued)

OTHER PUBLICATIONS

Patel.; "Simulating Realistic MRI variations to Improve Deep Learning model and visual explanations using GradCAM" 2021 IEEE International Conference on Cloud Computing in Emerging Markets (CCEM), pp. 1-8 (Year: 2021).*

(Continued)

*Primary Examiner* — Mia M Thomas
(74) *Attorney, Agent, or Firm* — Konrad, Raynes, Davda & Victor LLP; David Victor

(57) ABSTRACT

Provided are a computer program product, system, and method for training a pose estimation model to determine anatomy keypoints in images. A teacher network, implementing machine learning, processes images representing anatomies to produce heatmaps representing keypoints of the anatomies. An anatomy parsing network, implementing machine learning, processes the images to produce segmentation representations labeling anatomies represented in the images. The segmentation representations from the anatomy parsing network and the heatmaps from the teacher network are concatenated to produce mixed heatmaps. A pose estimation model, implementing machine learning, is trained to process the images to output predicted heatmaps to minimize a loss function of the output predicted heatmaps from the pose estimation model and the mixed heatmaps.

20 Claims, 4 Drawing Sheets

(58) Field of Classification Search

CPC .......... G06T 2207/20084; G06V 20/70; G06V 10/82

See application file for complete search history.

(56) References Cited

U.S. PATENT DOCUMENTS

| | | | | |
|---|---|---|---|---|
| 10,083,352 | B1 * | 9/2018 | Solh | G06V 10/443 |
| 10,176,642 | B2 * | 1/2019 | Tran | G06F 3/011 |
| 11,074,711 | B1 | 7/2021 | Akbas et al. | |
| 12,235,928 | B2 * | 2/2025 | Atanasoaei | G06F 18/214 |
| 12,387,365 | B1 * | 8/2025 | Barve | G06T 7/50 |
| 2018/0330506 | A1 * | 11/2018 | Grady | G06T 7/174 |
| 2019/0171871 | A1 * | 6/2019 | Zhang | G06V 40/103 |
| 2020/0334828 | A1 * | 10/2020 | Öztireli | G06N 20/00 |
| 2021/0045701 | A1 * | 2/2021 | Unklesbay | A61B 6/51 |
| 2021/0346091 | A1 * | 11/2021 | Haslam | G06T 7/0012 |
| 2021/0366146 | A1 * | 11/2021 | Khamis | G06T 11/00 |
| 2022/0101555 | A1 * | 3/2022 | Zhang | G06T 7/74 |
| 2022/0287668 | A1 * | 9/2022 | Gulsun | G16H 50/20 |
| 2024/0193866 | A1 * | 6/2024 | Verdie | G06F 3/017 |
| 2024/0296582 | A1 * | 9/2024 | Ramani | G06V 10/454 |

FOREIGN PATENT DOCUMENTS

| | | | | |
|---|---|---|---|---|
| CN | 112347861 | A | 2/2021 | |
| WO | WO-2018069736 | A1 * | 4/2018 | G06N 3/045 |
| WO | WO-2020144483 | A1 * | 7/2020 | G06N 3/0464 |
| WO | WO-2025057379 | A1 * | 3/2025 | G06T 7/70 |

OTHER PUBLICATIONS

E. Arazo, et al., "Pseudo-labeling and confirmation bias in deep semi-supervised learning", arXiv:1908.02983v5 [cs.CV], Jun. 29, 2020, 8 pp.

J. Carreira, et al., "Human pose estimation with iterative error feedback", arXiv:1507.06550v3 [cs.CV], Jun. 12, 2016, 10 pp.

H. Duan, et al., "Revisiting skeleton-based action recognition", In CVPR, pp. 2969-2978, 2022.

K. He, et al., "Deep residual learning for image recognition", In CVPR, pp. 770-778, 2016.

L. Ladicky, et al., "Human pose estimation using a joint pixel-wise and part-wise formulation", In CVPR, pp. 3578-3585, 2013.

D. Lee et al., "Pseudo-label: The simple and efficient semi-supervised learning method for deep neural networks", In Workshop on challenges in representation learning, ICML, vol. 3, p. 896, 2013.

P. Li, et al., "Self-correction for human parsing", arXiv:1910.09777v1 [cs.CV], Oct. 22, 2019, 10 pp.

X. Liang, et al., "Look into person: Joint body parsing & pose estimation network and a new benchmark", arXiv:1804.01984v1 [cs.CV], Apr. 5, 2018, 14 pp.

T. Lin, et al., "Microsoft coco: Common objects in context", arXiv:1405.0312v3 [cs.CV], Feb. 21, 2015, 15 pp.

A. Newell, et al., "Stacked hourglass networks for human pose estimation", arXiv:1603.06937v2 [cs.CV], Jul. 26, 2016, 17 pp.

X. Nie, et al., "Mutual Learning to Adapt for Joint Human Parsing and Pose Estimation," In ECCV, pp. 502-517, 2018.

X. Nie, et al., "Human pose estimation with parsing induced learner", In CVPR, pp. 2100-2108, 2018.

T. Pfister, et al., "Flowing ConvNets for human pose estimation in videos", arXiv:1506.02897v2 [cs.CV], Nov. 8, 2015, 13 pp.

T. Qiao, et al., "Geometric features informed multi-person human-object interaction recognition in videos", arXiv:2207.09425v1 [cs.CV], Jul. 19, 2022, 18 pp.

I. Radosavovic, et al., "Data distillation: Towards Omni-Supervised Learning", arXiv:1712.04440v1 [cs.CV], Dec. 12, 2017, 10 pp.

S. Ruder, "An Overview of Multi-Task Learning in Deep Neural Networks," arXiv:1706.05098v1 [cs.LG], Jun. 15, 2017, 14 pp.

M. Sajjadi, et al., "Regularization with stochastic transformations and perturbations for deep semi-supervised learning", arXiv:1606.04586v1 [cs.CV], Jun. 14, 2016, 9 pp.

K. Sohn, et al., "Fixmatch: Simplifying semi-supervised learning with consistency and confidence", NeurIPS 2020, pp. 596-608.

K. Sun, et al., "Deep high-resolution representation learning for human pose estimation", arXiv:1902.09212v1 [cs.CV], Feb. 25, 2019, 12 pp.

P. Sun, et al., "Counterfactual debiasing inference for compositional action recognition", In ACM MM, pp. 3220-3228, 2021.

X.Sun, et al., "Compositional human pose regression", arXiv:1704.00159v3 [cs.CV], Aug. 2, 2017, 11 pp.

A. Tarvainen, et al., "Mean teachers are better role models: Weight-averaged consistency targets improve semi-supervised deep learning results", arXiv:1703.01780v6 [cs.NE], Apr. 16, 2018, 16 pp.

J.Tompson, et al., "Joint training of a convolutional network and a graphical model for human pose estimation", arXiv:1406.02984v2 [cs.CV], Sep. 17, 2014, 9 pp.

A.Toshev, et al., "DeepPose: Human pose estimation via deep neural networks", arXiv: 1312.4659v3 [cs.CV], Aug. 20, 2014, 9 pp.

S. Vandenhende, et al., "Multi-task learning for dense prediction tasks: A survey", arXiv:2004.13379v3 [cs.CV], Jan. 24, 2021, 20 pp.

C. Wang, et al., "An Approach to pose-based action recognition", In CVPR, pp. 915-922, 2013.

Y. Wang, et al., "Freematch: Self-adaptive thresholding for semi-supervised learning", arXiv:2205.07246v3 [cs.LG], Jan. 31, 2022, 20 pp.

S. Wei, et al., "Convolutional pose machines", arXiv:1602.00134v4 [cs.CV], Apr. 12, 2016, 9 pp.

B. Wu, et al., "Star: A benchmark for situated reasoning in real-world videos", In NeurIPS, 2021, 13 pp.

F. Xia, et al., "Joint multi-person pose estimation and semantic part segmentation", arXiv:1708.03383v1 [cs.CV], Aug. 10, 2017, 10 pp.

Bi. Xiao, et al., "Simple baselines for human pose estimation and tracking", arXiv:1804.06208v2 [cs.CV], Aug. 21, 2018, 16 pp.

R. Xie, et al., "An empirical study of the collapsing problem in semi-supervised 2D human pose estimation", In ICCV, pp. 11220-11229, 2021.

Y. Xu, et al., "Dash: Semi-supervised learning with dynamic thresholding", arXiv:2109.00650v1 [cs.LG], Sep. 1, 2021, 22 pp.

Y. Xu, et al., "Vitpose: Simple vision transformer baselines for human pose estimation", arXiv:2204.12484v3 [sc.CV], Oct. 13, 2022, 16 pp.

K. Yamaguchi, et al., "Parsing clothing in fashion photographs" In CVPR, pp. 3570-3577, 2012.

D. Zeng, e al., "Neural architecture search for joint human parsing and pose estimation", In ICCV, pp. 11365-11374, 2021.

B. Zhang, et al., "Flexmatch: Boosting semi-supervised learning with curriculum pseudo labeling", In NeurIPS 2021, 16 pp.

Y. Zhang, et al., "Stst: Spatial-temporal specialized transformer for skeleton-based action recognition", In ACM MM, pp. 3229-3237, 2021.

Y. Zhang, et al., "An overview of multi-task learning", National Science Review, 5(1):30-43, 2018.

Y. Zhang, et al., "A survey on multi-task learning", IEEE Transactions on Knowledge and Data Engineering, 34:5586-5609, 2021.

J. Wu et al., "Modeling the Uncertainty with Maximum Discrepant Students for Semi-supervised 2D Pose Estimation." Published: Feb. 1, 2023, Last Modified: Feb. 13, 2023, https://openreview.net/forum?id=wOTLra5iXh, 11 pp.

R. De Bem et al., "A conditional deep generative model of people in natural images." In 2019 IEEE Winter Conference on Applications of Computer Vision (WACV), pp. 1449-1458. IEEE, 2019.

X. He, et al., "AutoLink: Self-supervised Learning of Human Skeletons and Object Outlines by Linking Keypoints," In NeurIPS, 2022, 35 pp.

W. Liu, "Recent Advances in Monocular 2D and 3D Human Pose Estimation: A Deep Learning Perspective," Journal of Latex Class Files, vol. X, No. X, 2021, 28 pp.

C. Zheng, et al., "Deep Learning-Based Human Pose Estimation: A Survey," ACM, vol. 37, No., 4, Article 111, Aug. 2018, 35 pp.

(56) References Cited

OTHER PUBLICATIONS

O. Chapelle et al., "Semi-Supervised Learning", The MIT Press, 2006, 524 pp.

* cited by examiner

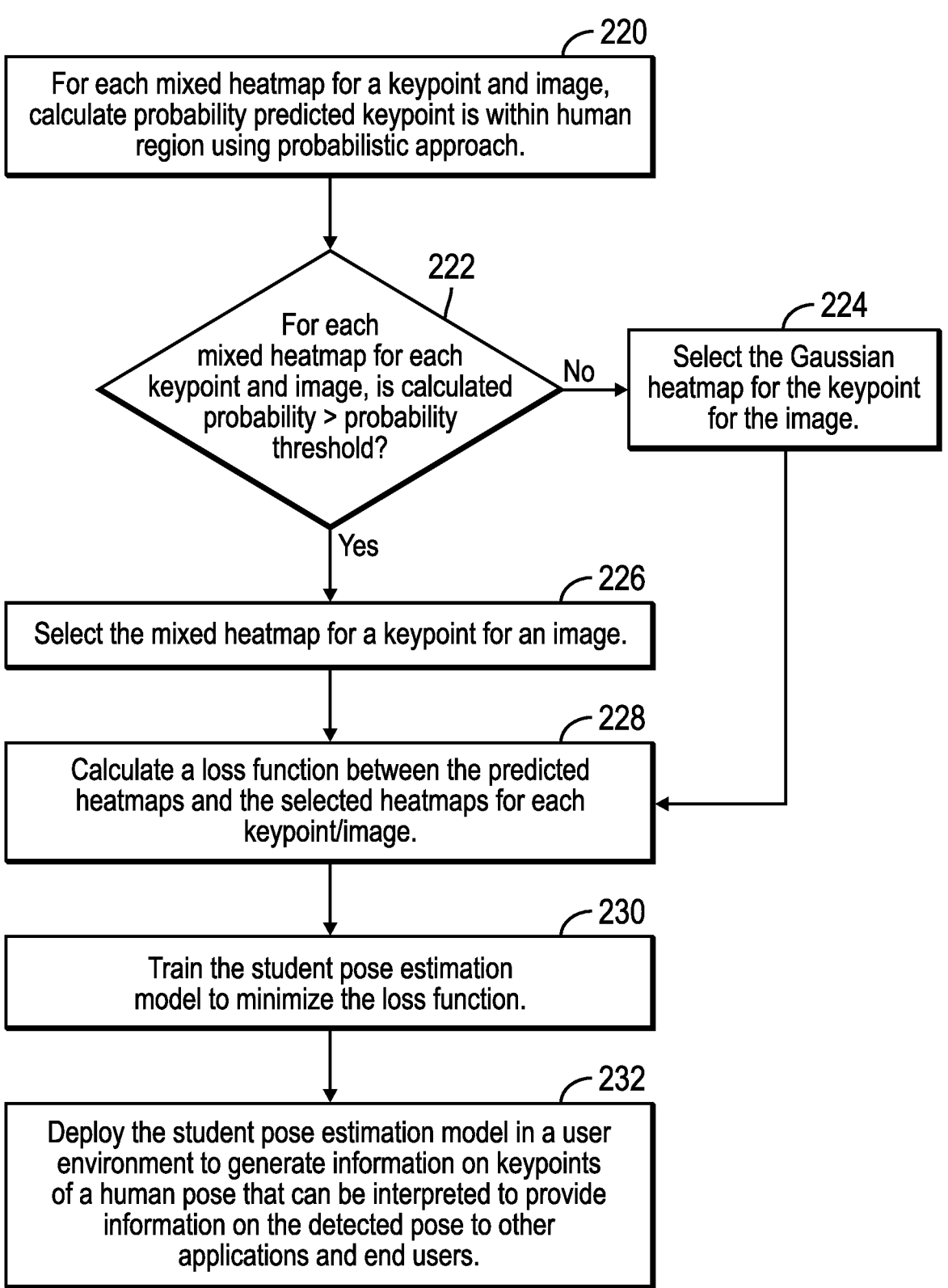

220

For each mixed heatmap for a keypoint and image, calculate probability predicted keypoint is within human region using probabilistic approach.

222

For each mixed heatmap for each keypoint and image, is calculated probability > probability threshold?

224

Select the Gaussian heatmap for the keypoint for the image.

No

Yes

226

Select the mixed heatmap for a keypoint for an image.

228

Calculate a loss function between the predicted heatmaps and the selected heatmaps for each keypoint/image.

230

Train the student pose estimation model to minimize the loss function.

232

Deploy the student pose estimation model in a user environment to generate information on keypoints of a human pose that can be interpreted to provide information on the detected pose to other applications and end users.

TRAINING A POSE ESTIMATION MODEL TO DETERMINE ANATOMY KEYPOINTS IN IMAGES

BACKGROUND OF THE INVENTION

1. Field of the Invention

The present invention relates to a computer program product, system, and method for training a pose estimation model to determine anatomy keypoints in images.

2. Description of the Related Art

Human pose estimation computer technology seeks to locate the keypoints of the human anatomy (such as eyes, knees, arms, legs, etc.) within an image or a video, which is a fundamental task in the field of computer vision and has various practical applications, including action recognition, human-object interaction, pose tracking, and visual reasoning. Early efforts in deep learning directly regress keypoint coordinates from the given images. Recent supervised approaches have adopted a heatmap based framework for better supervision.

Despite substantial advancements in supervised learning, substantial labeled data is crucial for its effectiveness. Improving pose estimation performance through the use of larger, high-quality datasets in supervised learning is costly, as collecting labeled data can be both time consuming and labor-intensive. To mitigate the need for labeled data, some attempts have been made towards semi-supervised human pose estimation, leveraging both limited labeled images and abundant unlabeled images. However, semi-supervised learning in human pose estimation is challenging due to the limited number of labeled images and the sparse labeling structure (i.e., the number of background pixels in images is dominant).

Existing semi-supervised human pose estimation methods focus on effectively using abundant unlabeled images. Pseudo-labeling and consistency regularization are two common paradigms for utilizing unlabeled images. The pseudo-labeling paradigm generates pseudo-labels for unlabeled images using a fixed teacher network pre-trained on limited labeled images, and then uses these pseudo-labels for supervised training. However, the fixed teacher network's performance is limited by the initial labeled data, leading to the generation of incorrect pseudo-labels that cannot be rectified.

There is a need in the art for improved techniques to train a pose estimation model to estimate keypoints in an image of a body.

SUMMARY

Provided are a computer program product, system, and method for training a pose estimation model to determine anatomy keypoints in images. A teacher network, implementing machine learning, processes images representing anatomies to produce heatmaps representing keypoints of the anatomies. An anatomy parsing network, implementing machine learning, processes the images to produce segmentation representations labeling anatomies represented in the images. The segmentation representations from the anatomy parsing network and the heatmaps from the teacher network are concatenated to produce mixed heatmaps. A pose estimation model, implementing machine learning, is trained to process the images to output predicted heatmaps to minimize a loss function of the output predicted heatmaps from the pose estimation model and the mixed heatmaps.

BRIEF DESCRIPTION OF THE DRAWINGS

FIGS. 2a and 2b illustrate an embodiment of operations to use a teacher network and anatomy parsing network to train a pose estimation model in a pose estimation network.

DETAILED DESCRIPTION

Figure 1:
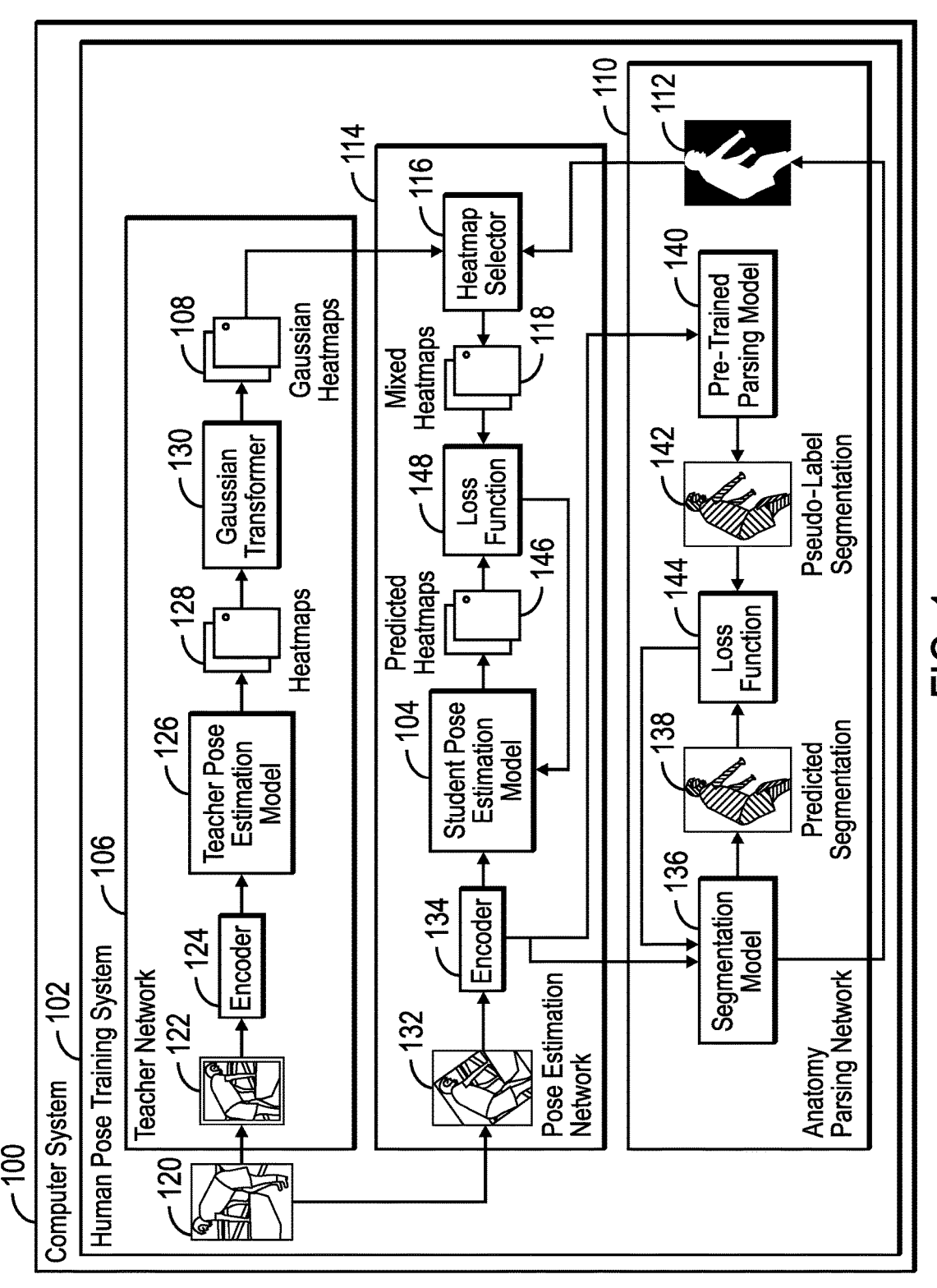
FIG. 1 illustrates an embodiment of a human pose training system.

In current techniques using a teacher network to train a student network, the teacher network's predictions for unlabeled images (pseudo-labels) contain noise. Existing methods for pose estimations do not consider constraining the impact of noise present in pseudo-labels on the student network's learning which increases confidence in erroneous predictions because of learning from unreliable pseudo-labels. Further, existing methods over-rely on the sparse and noisy pseudo-labels. The pseudo heatmap reveals a limited high-density keypoint area within an image, indicating that predicted keypoint locations are sparsely distributed. This sparsity makes the pseudo heatmap less error-tolerant. The model cannot learn the approximate range of the correct keypoint with an incorrect pseudo heatmap. When learning with unlabeled images, the student network focuses solely on the potentially incorrect pseudo heatmaps, with the risk of overfitting to the wrong guidance.

Described embodiments address the above technical problems by providing regional guidance for semi-supervised human pose estimation. The regional guidance comprises a type of supervision signal that covers regions of an image rather than individual pixels. The regional guidance extends the consistency regularization paradigm from the perspective of regional guidance. Described embodiments introduce dense regional guidance through human parsing, which aims to segment the semantics of different parts of the human body. For instance, humans estimate pose by leveraging semantic knowledge of each body part, often unconsciously. Inspired by this, described embodiments propose an extra human parsing branch that uses human parsing as an auxiliary task, which makes the student network capable of simultaneously performing pose estimation and human parsing. The additional human parsing branch guides the pose estimation results to be consistent with the human body structure, instead of relying solely on potentially incorrect pseudo-labels, as the predictions of both human parsing and pose estimation are made from the shared representations.

Further, described embodiments improve the pseudo-heatmap form and avoid the disadvantages of existing pseudo heatmaps by selectively regenerating Gaussian pseudo heatmaps using relatively accurate predicted keypoints while keeping the remaining pseudo heatmaps as the relaxed version. In this way, a heatmap selection module incorporates regional guidance to optimize the pseudo-label generation and selectively chooses regenerated Gaussian pseudo heatmaps based on the dynamic categorical thresholds of heatmap response and the prior knowledge of human parsing (e.g., the predicted keypoints should lie within the human body area). The human parsing is combined with the remaining relaxed pseudo heatmaps to produce mixed pseudo heatmaps. The mixed pseudo heatmaps are more effective than traditional pseudo heatmaps for supervising student network learning.

Described embodiments mitigate the training difficulty issue from sparse supervision of pose keypoints by utilizing the human parsing branch to provide dense regional guidance, resulting in keypoint predictions that align better with human body topology.

Described embodiments analyze the limitations of existing types of pseudo-labels and note their inevitable noise. The heatmap selection module mitigates the interference from the background and noise of pseudo-labels with prior knowledge of the human body.

FIG. 1 illustrates an embodiment of a computer system 100 including a human pose training system 102 to train the student pose estimation model 104 to recognize keypoints of human anatomy, e.g., eyes, knee, arms, head, etc., or the anatomy of another creature, in an image. Although embodiments are described with respect to estimating parts of human anatomy, the described embodiments may be applied to estimate the anatomy of other creatures. The human pose training system 102 consists of three components, a teacher network 106 to generate Gaussian heatmaps 108, an anatomy parsing network 110 trained to produce a segmentation 112, e.g., mask, identifying the anatomy of the input image, i.e., a semantic labeling of the anatomical parts, and a pose estimation network 114 to train the student pose estimation model 104 to provide accurate heatmaps identifying keypoints of the human anatomy in a received input image. A heatmap selector 116 concatenates the segmentation 112, i.e., mask, with the Gaussian heatmap 108 to produce mixed heatmaps 118 used to train the student pose estimation model 104. Different heatmaps may be produced for the keypoints of each image, so that the processing is performed for each image and each keypoint of the image 120.

The terms anatomy, anatomical parts, anatomical region, body, and body parts are used herein to refer to the anatomy or anatomical parts of a human or other creature represented in the image 120.

The teacher network 106 upon receiving an image 120 may perform easy augmentation of the image to produce an augmented image 122 that is processed by an encoder 124 to generate an image vector representing the image in a vector space that is inputted to the teacher pose estimation model 126, comprising a machine learning model, to generate heatmaps 128. A Gaussian transformer 130 maps the heatmaps 128 into Gaussian heatmaps 108. There may be a separate teacher pose estimation model 126 for each keypoint in an image of the human anatomy to be trained to produce a heatmap identifying a specific keypoint of the human anatomy, where each teacher pose estimation model 126 generates a separate heatmap 128 so there is a heatmap 128 for each keypoint to identify that is transformed into Gaussian heatmaps 108 for the different keypoints.

The pose estimation network 114 comprises the student pose estimation model 104 that is trained from the output from the teacher network 106 and the anatomy parsing network 110, which comprises an auxiliary teaching network to provide the regional guidance from the human parsing. The anatomy parsing network 110 trains the student network to simultaneously perform pose estimation and human parsing, relaxing the learning difficulty of pose estimation in semi-supervised learning and preventing relying solely on potentially incorrect pseudo-labels The pose estimation network 114 receives the image 120 of a human pose that is augmented using hard augmentation to an augmented image 132. The encoder 134 generates an image vector from the image 132 to input into the student pose estimation model 104 and the segmentation model 136 in the anatomy parsing network 110. Thus, the student pose estimation model 104 and the segmentation model 136 share a same encoder 134. The segmentation model 136 processes the input image vector from the encoder 134, such as one for each keypoint to estimate, and generates a predicted segmentation 138 comprising the human parsing information or human mask that labels and identifies the body parts with semantic understanding.

A pre-trained parsing model 140, comprising a machine learning model, receives as input the image vector from encoder 134 and generates a pseudo-label segmentation 142 identifying the body parts to provide a ground truth segmentation. A loss function 144 is used to minimize the difference between the predicted segmentation 138 and the pseudo-label segmentation 142 to train the segmentation model 136, using backpropagation and other techniques, to produce segmentations 138 that minimize the loss function 144. As with the heatmaps, there may be one segmentation 138, 142 for each of the keypoints to determine, which each segmentation 138, 142 identifies/labels one of the keypoints, e.g., right knee, left knee, right arm, left arm, head, etc.

The student pose estimation model 104 outputs predicted heatmaps 146, where there is a predicted heatmap 146 for each of the keypoints to estimate. Loss function 148 is defined to minimize a loss between the predicted heatmaps 146 and the mixed heatmaps 118, which provide the ground truth for the training. The student pose estimation model 104 is trained, such as using back propagation, to minimize the loss function 148.

In certain embodiments, many of the described components, such as the encoders 124, 134, teacher pose estimation model 126, student pose estimation model 104, segmentation model 136, and pre-trained parsing model 140 may use machine learning and deep learning algorithms, such as decision tree learning, association rule learning, neural networks, inductive programming logic, support vector machines, Bayesian network, recurrent neural networks (RNN), Feedforward neural networks, Convolutional Neural Networks (CNN), etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the expected output having specified confidence levels based on the input parameters.

Backward propagation may comprise an algorithm for supervised and semi-supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, margins of error are determined based on a difference of the calculated predictions and user rankings of the output. Biases (parameters) at nodes in the hidden layer are adjusted accordingly to minimize the margin of error of the error function.

In an alternative embodiment, other techniques may be used to train the components, such as an unsupervised machine learning module, or machine learning implemented in methods other than neural networks, such as multivariable linear regression models.

Generally, program modules, such as the program components 102, 104, 106, 110, 114, 116, 124, 126, 130, 134, 136, 140, among others, may comprise routines, programs, objects, components, logic, data structures, and so on that perform particular tasks or implement particular abstract data types. The program components and hardware devices of the computer systems 100 of FIG. 1 may be implemented in one or more computer systems, where if they are implemented in multiple computer systems, then the computer systems may communicate over a network.

The program components in FIG. 1, including components 102, 104, 106, 110, 114, 116, 124, 126, 130, 134, 136, 140, among others, may be accessed by a processor from memory to execute. Alternatively, some or all of the program components in FIG. 1, including components 102, 104, 106, 110, 114, 116, 124, 126, 130, 134, 136, 140, among others, may be implemented in separate hardware devices, such as one or more Application Specific Integrated Circuit (ASIC) hardware devices.

The functions described as performed by the program components of FIG. 1 may be implemented as program code in fewer program modules than shown or implemented as program code throughout a greater number of program modules than shown.

The computer system 100 may comprise a suitable computer with sufficient computational power to run the networks 106, 110, and 114. The final trained student pose estimation model 104 may be deployed in any computational device in which it would be utilized, including servers and a personal computing device, such as a laptop, desktop computer, tablet, smartphone, wearable computer, server class computing devices, or other suitable computing devices.

Figure 2A:
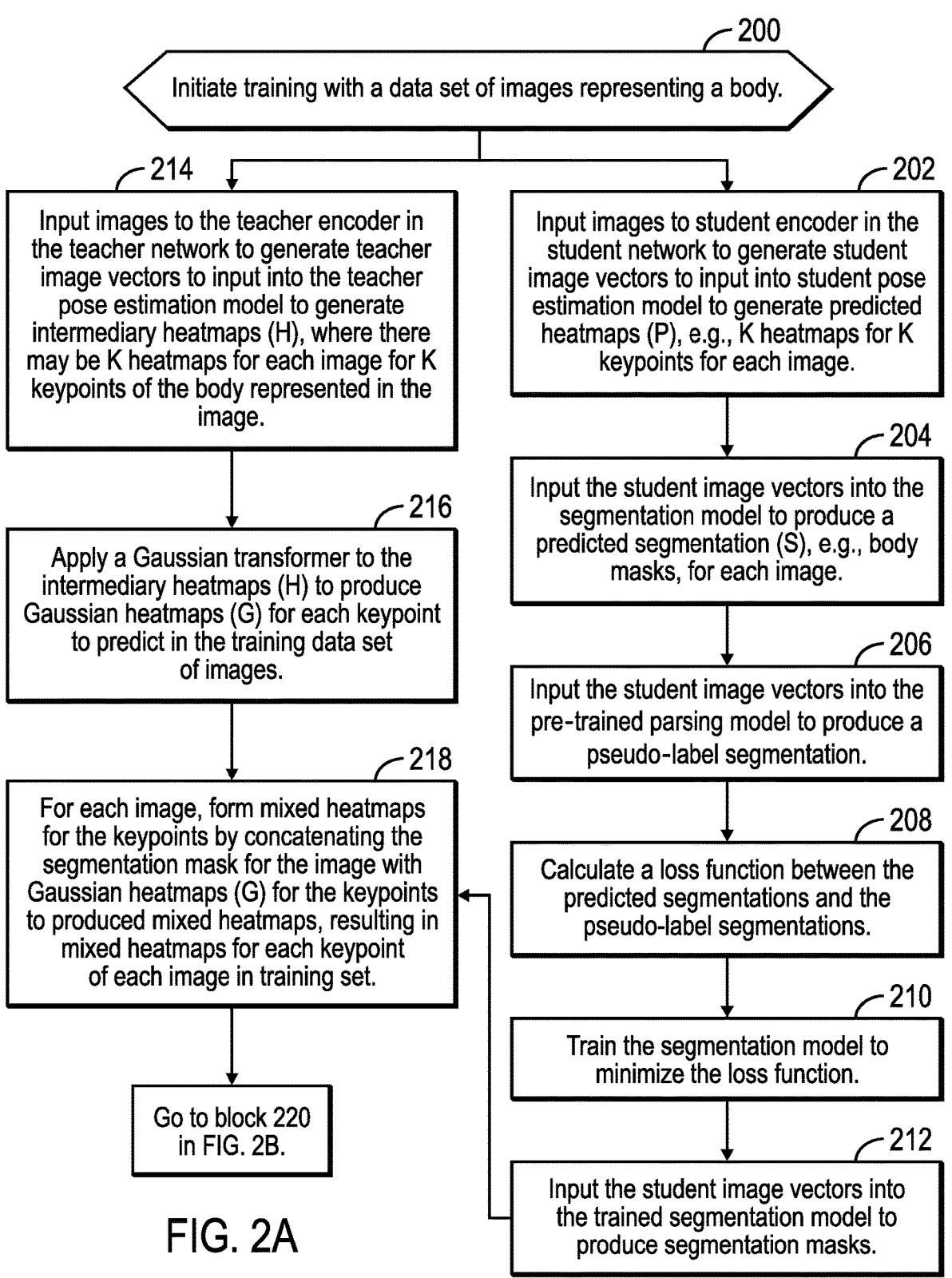

FIGS. 2a and 2b illustrate an embodiment of operations performed by the components of the human pose training system 102, including the teacher network 106, pose estimation network 114, and anatomy parsing network 110, and components therein, to train the pose estimation model 104 to estimate keypoints of the anatomy of a human, or other creatures. Upon initiating (at block 200) training with a data set of images 120 representing a body in a pose, which may comprise unlabeled images, the pose estimation network 114 inputs (at block 202) images 132, which may comprise augmentations of the original images 120, into a student encoder 134, in a student network comprising the pose estimation network 114, to generate student image vectors to input into the student pose estimation model 104. The image vectors are inputted into the student pose estimation model 104 to generate predicted heatmaps (P) 146. There may be K student pose estimation models 104 to generate K heatmaps 146 for the K keypoints in the pose in the image 132, one heatmap for each keypoint.

Concurrently with step 202, the anatomy parsing network 110 inputs (at block 204) the student image vectors from the encoder 134 into the segmentation model 136 in the anatomy parsing network 110 to produce a predicted segmentation(S) 138, e.g., body mask, for each image 132. Concurrently with steps 202 and 204, the anatomy paring network 1140 inputs (at block 206) student image vectors, from encoder 134, into the pre-trained parsing model 140 to produce a pseudo-label segmentation 142 for each image 132. A loss function 144 is calculated (at block 208) between the predicted segmentations 138 and the pseudo-label segmentations 142 from the images in the training data set. The anatomy parsing network 110 uses (at block 210) the loss function 144 to train the segmentation model 136 to minimize the loss function 144. In this way, the auxiliary anatomy parsing network 110 is continually retrained to improve the prediction of the human mask 112, which comprises a semantic description of the parts of the anatomy in the images 120.

At the same time the images 120 are provided to the student encoder 134, the teacher network 106 inputs (at block 214) the images 122, which may comprise an augmentation of the original images 120, to the teacher encoder 124 in the teacher network 106 to generate teacher image vectors to input into the teacher pose estimation model 126 to generate intermediary heatmaps (H) 128, where there may be K heatmaps for each image for the K keypoints of the body represented in the image. A Gaussian transformer 130 is applied (at block 216) to the intermediary heatmaps (H) 128 to produce Gaussian heatmaps (G) 108 for the training data set of images, where there may be K Gaussian heatmaps 108 for each keypoint of the body in the image. From blocks 212 and 216, the heatmap selector 116 forms (at block 218), for each image 120, K mixed heatmaps 118 for the K keypoints by concatenating the segmentation mask 112 for the image with each of the K gaussian heatmaps (G) 108.

Control then proceeds to block 220 in FIG. 2b where the heatmap selector 116 calculates (at block 220), for each mixed heatmap 118 for a keypoint and image, a probability, using a probabilistic approach, that the predicted keypoint in the mixed heatmap 118 for the keypoint is within a human region. The human region for a keypoint may be defined from the human mask 112, which shows a mask of keypoints in an anatomy. The heatmap selector 116 determines (at block 222), for each mixed heatmap 118 for each keypoint and image 120, whether the calculated probability is greater than a threshold probability, e.g., 70%. If (at block 222) the calculated probability is less than the probability threshold, then the heatmap selector 116 selects (at block 224) the Gaussian heatmap 108 as the ground truth to train the pose estimation model 104 for the keypoint and the image. If (at block 222) the calculated probability is greater than the probability threshold, then the heatmap selector 116 selects the mixed heatmap 118 for the keypoint and the image. The selected heatmap 108 or 118 operates as the ground truth in the loss function 148 to train the student pose estimation model 104. In this way, the heatmap selector 116 may regenerate the Gaussian pseudo-heatmaps 108 by selecting relatively accurate predicted keypoints based on the dynamic categorical thresholds of heatmap response and the prior knowledge of the human parsing reflected in the anatomy mask 112. Predicted heatmaps 146 of the student network 114 are supervised by refined pseudo heatmaps 118 generated by the heatmap selector 116.

The pose estimation network 114 calculates (at block 228) a loss function 148 between the predicted heatmaps 146 and the selected mixed heatmaps 118 or selected heatmaps 108 for the keypoints of the images. The pose estimation network 114 trains (at block 230) the student pose estimation model 104 to minimize the loss function 148. After training on one or more datasets of unlabeled images, the student pose estimation model 104 may be deployed (at bock 232) in a user environment to generate information on keypoints of a human pose that can be interpreted to provide information on the detected pose to other applications and end users.

In the above embodiments, the teacher network 106 and the anatomy parsing network 110 may in parallel process the encoded images 120 so that their outputs 108 and 112, respectively, are provided at relatively the same time to the heatmap selector 116 to use to produce the mixed heatmaps 118. Further, while the teacher network 106 and the anatomy parsing network 110 are parallel processing the image vectors, the pose estimation network 114 may process the image vector to generate the predicted heatmaps 146 to be available at the time the mixed heatmaps 118 become available to optimize the training process.

In the embodiment of FIGS. 2*a* and 2*b*, the image 120 is subject to an easy augmentation to produce image 122 for the teacher network 106 and the image 120 is subject to a hard augmentation to produce image 132 for the pose estimation network 114 and the anatomy parsing network 110. In alternative embodiments, other augmentations or transformations may be performed on the image 120. In the described embodiments the heatmaps 128 are transformed to Gaussian heatmaps 108 through a Gaussian mapping. In alternative embodiments, the heatmaps 128 may be transformed using other transformation mappings or not transformed.

In certain embodiments, the anatomy parsing network 110 may not be trained with extra human parsing datasets in the semi-supervised setting. Further, to avoid introducing extra computational costs in inference, the pose estimation network 114 calculations may be relatively independent of the anatomy parsing network 110. Further, the anatomy parsing network 110 may only be available to the student pose estimation network 114 and can be discarded for better inference efficiency after training. The anatomy parsing network and the pose estimation network 114 share the same backbone network in the encoder 134, but their models 104 and 136 do not interact with each other.

In certain embodiments, the original pose estimation network 114 may be denoted as $f_\theta = f_{\theta,pose} \circ f_{\theta,enc}$, where $\theta$ denotes network parameters, $f_{\theta,enc}$ refers to the encoder 134, e.g., backbone network, and $f_{\theta,pose}$ refers to the prediction pose estimation model 104. The pose estimation model 104 may be denoted as $f_{\theta,seg}$. The pre-trained parsing model 140 may comprise a pre-trained model of human parsing, such as Self-Correction for Human Parsing (SCHP) model, to generate the pseudo-label segmentations of the unlabeled training set of images 120 to train the anatomy parsing network 110.

For a set of unlabeled images unlabeled image $$I_i^u,$$

where i is the number of an image of a set of u images, the pseudo-label segmentation 142 of a hard augmented unlabeled image $$T_h(I_i^u)$$

may be denoted as $$Y_i^u,$$

where $T_h$ refers to hard augmentation, such as from Semi-Pose. The predicted human segmentation 138 may comprise equation (1) below:

$$\hat{Y}_i^u == f_{\theta,seg} \circ f_{\theta,enc}(T_h(I_i^u)) \qquad (1)$$

In such case, the loss function 144, $L_{seg}$, may be calculated according to equation (2) below:

$$L_{seg} = \frac{1}{B} \sum_{i=1}^{B} CE(\hat{Y}_i^u, Y_i^u), \qquad (2)$$

where B is the batch size, and CE is a pixel-wise cross-entropy loss function.

The heatmap selector 116 may select between the pseudo heatmaps 108 outputted from the Gaussian transformer 130 or a mixed heatmap 118 comprising the Gaussian heatmap 108 matrix concatenated with the human mask 112, where the concatenation may comprise a Hadamard product, i.e., element-wise multiplication of two matrices, for the keypoint. The mixed heatmap 118 is used if the probability the predicted keypoints of the mixed heatmap 118 are greater than a probability threshold, such as 0.7, indicating the probability the keypoints of the mixed heatmap 118 are within the human region. If they are not greater than the threshold, then the pseudo heatmap 108 is used to train the student pose estimation model 104.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 3:
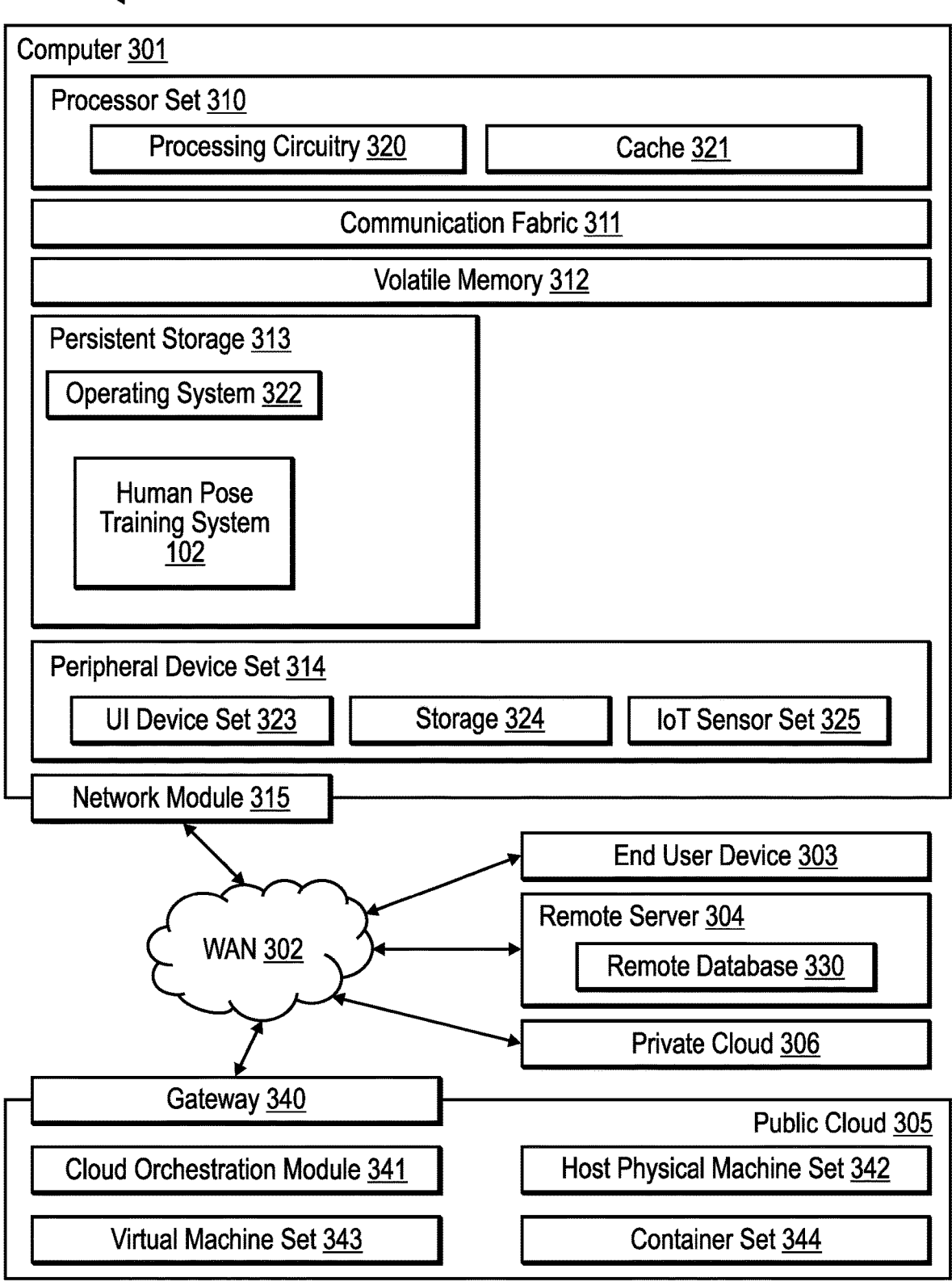
FIG. 3 illustrates a computing environment in which the components of FIGS. 1 and 2 may be implemented.

With respect to FIG. 3, computing environment 300 contains an example of an environment for the execution of at least some of the computer code involved in performing the inventive methods concerning how to train a pose estimation model 104 using the human pose training system 102 described above with respect to FIG. 1. In addition to the human pose training system 102, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and human pose training system 102, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

COMPUTER 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

PROCESSOR SET 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in human pose training system 102 in persistent storage 313.

COMMUNICATION FABRIC 311 is the signal conduction path that allows the various components of computer 301 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

PERSISTENT STORAGE 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in the human pose training system 102, typically includes at least some of the computer code involved in performing the inventive methods.

PERIPHERAL DEVICE SET 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

NETWORK MODULE 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on. The trained pose estimation model 104 may be deployed in EUD 303 to determine keypoints of human anatomy in images.

REMOTE SERVER 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

PUBLIC CLOUD 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for training a pose estimation model to locate anatomy keypoints in an anatomy represented in a digital image, the computer program product comprising a computer readable storage medium having computer readable program code embodied therein that is executable to perform operations, the operations comprising:

processing, by a teacher network, implementing machine learning, images representing anatomies to produce heatmaps representing keypoints of the anatomies;

processing, by an anatomy parsing network, implementing machine learning, the images to produce segmentation representations labeling anatomies represented in the images;

concatenating the segmentation representations from the anatomy parsing network and the heatmaps from the teacher network to produce mixed heatmaps; and training the pose estimation model, implementing machine learning, to process the images to output predicted heatmaps to minimize a loss function of the output predicted heatmaps from the pose estimation model and the mixed heatmaps.

2. The computer program product of claim 1, wherein the operations further comprise:

determining whether a probability that a mixed heatmap has keypoints within an anatomical region exceeds a probability threshold, wherein the mixed heatmap is used to train the pose estimation model for an image in response to the probability exceeding the probability threshold; and using a heatmap of the heatmaps for an image to train the pose estimation model in response to the probability not exceeding the probability threshold.

3. The computer program product of claim 1, wherein the pose estimation model comprises a student pose estimation model, wherein the operations further comprise:

generating, by a teacher pose estimation model in the teacher network, a first set of heatmaps representing keypoints of an anatomy; and applying a Gaussian transformer to the first set of heatmaps to generate Gaussian heatmaps representing the keypoints of the anatomy, wherein the Gaussian heatmaps comprise the heatmaps concatenated with the segmentation representations to produce the mixed heatmaps.

4. The computer program product of claim 1, wherein a data set of images is used to train a segmentation model in the anatomy parsing network to produce segmentation representations that are concatenated with the heatmaps to produce the mixed heatmaps.

5. The computer program product of claim 1, wherein the anatomy parsing network comprises:

a segmentation model that processes the images to produce predicted segmentations of the images;

a pre-trained parsing model to produce pseudo-label segmentations of the images; and wherein the anatomy parsing network performs:

determining a loss function to minimize a difference of the predicted segmentations from the segmentation model and the pseudo-label segmentations from the pre-trained parsing model; and training the segmentation model to produce predicted segmentations to minimize the loss function.

6. The computer program product of claim 5, wherein the operations further comprise:

mapping, by an encoder, the images to image vectors to input into the pose estimation model in a pose estimation network to output predicted heatmaps, to input into the segmentation model of the anatomy parsing network to produce the predicted segmentations, and to input into the pre-trained parsing model to produce the pseudo-label segmentations used to train the segmentation model.

7. The computer program product of claim 5, wherein the images on which the pose estimation model and the segmentation model are trained comprise unlabeled images.

8. The computer program product of claim 5, wherein the images inputted into the pose estimation model and the segmentation model comprise hard augmented images resulting from a hard augmentation of the images, and wherein the images inputted into a teacher pose estimation model in the teacher network to produce the heatmaps comprise easy augmented images resulting an easy augmentation of the images.

9. A system for training a pose estimation model to locate anatomy keypoints in an anatomy represented in a digital image, comprising:

a teacher network, implementing machine learning, to process images representing anatomies to produce heatmaps representing keypoints of the anatomies;

an anatomy parsing network, implementing machine learning, to process the images to produce segmentation representations labeling anatomies represented in the images;

a heatmap selector to concatenate the segmentation representations from the anatomy parsing network and the heatmaps from the teacher network to produce mixed heatmaps; and a computer readable storage medium having program instructions executed to train the pose estimation model, implementing machine learning, to process the images to output predicted heatmaps to minimize a loss function of the output predicted heatmaps from the pose estimation model and mixed heatmaps.

10. The system of claim 9, wherein the heatmap selector further performs:

determining whether a probability that a mixed heatmap has keypoints within an anatomical region exceeds a probability threshold, wherein the mixed heatmap is used to train the pose estimation model for an image in response to the probability exceeding the probability threshold; and using a heatmap of the heatmaps for an image to train the pose estimation model in response to the probability not exceeding the probability threshold.

11. The system of claim 9, wherein the pose estimation model comprises a student pose estimation model, wherein the teacher network further comprises:

a teacher pose estimation model to generate a first set of heatmaps representing keypoints of an anatomy; and a Gaussian transformer to transform the first set of heatmaps to Gaussian heatmaps representing the keypoints of the anatomy, wherein the Gaussian heatmaps comprise the heatmaps concatenated with the segmentation representations to produce the mixed heatmaps.

12. The system of claim 9, wherein the anatomy parsing network comprises:

a segmentation model in the anatomy parsing network trained with a data set of images to produce segmentation representations that are concatenated with the heatmaps to produce the mixed heatmaps.

13. The system of claim 9, wherein the anatomy parsing network comprises:

a segmentation model to process the images to produce predicted segmentations of the images; and a pre-trained parsing model to produce pseudo-label segmentations of the images, wherein a loss function is used to minimize a difference of the predicted segmentations from the segmentation model and the pseudo-label segmentations from the pre-trained parsing model, and wherein the segmentation model is trained to produce predicted segmentations to minimize the loss function.

14. The system of claim 13, further comprising:

an encoder to map the images to image vectors to input into the pose estimation model in a pose estimation network to output predicted heatmaps, to input into the segmentation model of the anatomy parsing network to produce the predicted segmentations, and to input into the pre-trained parsing model to produce the pseudo-label segmentations used to train the segmentation model.

15. A method for training a pose estimation model to locate anatomy keypoints in an anatomy represented in a digital image, comprising:

processing images representing anatomies to produce heatmaps representing keypoints of the anatomies;

processing the images to produce segmentation representations labeling anatomies represented in the images;

concatenating the segmentation representations and the heatmaps to produce mixed heatmaps; and training the pose estimation model, implementing machine learning, to process the images to output predicted heatmaps to minimize a loss function of the output predicted heatmaps from the pose estimation model and the mixed heatmaps.

16. The method of claim 15, further comprising:

determining whether a probability that a mixed heatmap has keypoints within an anatomical region exceeds a probability threshold, wherein the mixed heatmap is used to train the pose estimation model for an image in response to the probability exceeding the probability threshold; and using a heatmap of the heatmaps for an image to train the pose estimation model in response to the probability not exceeding the probability threshold.

17. The method of claim 15, further comprising:

generating a first set of heatmaps representing keypoints of an anatomy; and applying a Gaussian transformer to the first set of heatmaps to generate Gaussian heatmaps representing the keypoints of the anatomy, wherein the Gaussian heatmaps comprise the heatmaps concatenated with the segmentation representations to produce the mixed heatmaps.

18. The method of claim 15, further comprising:

using a data set of images to train a segmentation model to produce segmentation representations that are concatenated with the heatmaps to produce the mixed heatmaps.

19. The method of claim 15, computer program product of claim 1, further comprising:

processing, by a segmentation model, the images to produce predicted segmentations of the images;

generating, by a pre-trained parsing model, pseudo-label segmentations of the images;

determining a loss function to minimize a difference of the predicted segmentations from the segmentation model and the pseudo-label segmentations from the pre-trained parsing model; and training the segmentation model to produce predicted segmentations to minimize the loss function.

20. The method of claim 19, further comprising:

mapping, by an encoder, the images to image vectors to input into the pose estimation model in a pose estimation network to output predicted heatmaps, to input into the segmentation model to produce the predicted segmentations, and to input into the pre-trained parsing model to produce the pseudo-label segmentations used to train the segmentation model.

\* \* \* \* \*